May 25, 1926.  1,585,835

P. DURAND

AUTOMATIC WEIGHING APPARATUS

Filed March 26, 1925   2 Sheets-Sheet 1

Paul Durand
By H. S. Mackaye
Attorney

May 25, 1926.
P. DURAND
1,585,835
AUTOMATIC WEIGHING APPARATUS
Filed March 26, 1925    2 Sheets-Sheet 2
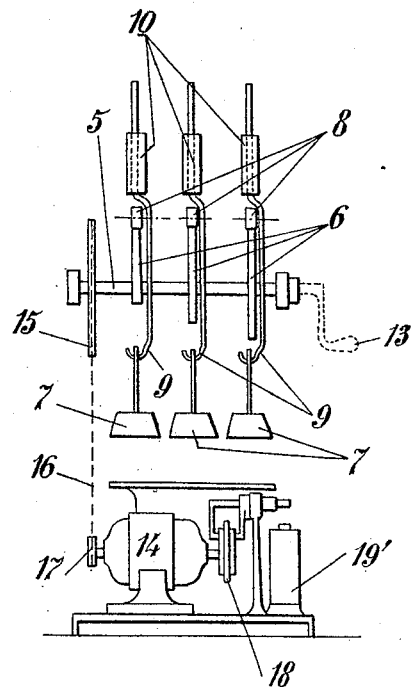
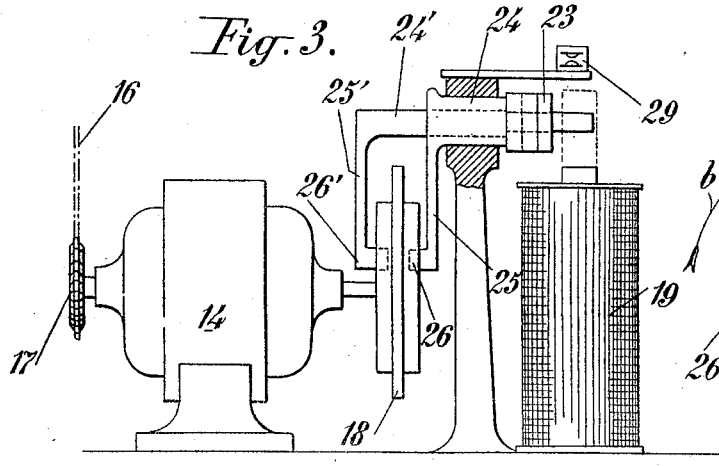
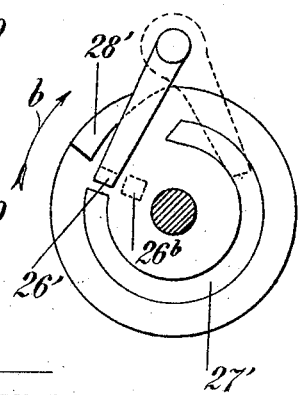

Patented May 25, 1926.

1,585,835

UNITED STATES PATENT OFFICE.

PAUL DURAND, OF PARIS, FRANCE.

AUTOMATIC WEIGHING APPARATUS.

Application filed March 26, 1925. Serial No. 18,455.

The present invention relates to improvements in semi-automatic weighing apparatus or scales, giving direct readings of the kind in which supplementary unit weight are put into or out of action by manually operated mechanism.

The present improvement consists in an automatic mechanism adapted to suitably operate a supplementary unit weight or weights as soon as the object to be weighed causes the weight indicating needle or pointer to move beyond the normal course graduated on the dial. In short it brings into or withdraws from action the required weight to return the scales to a state of equilibrium and to keep the needle within the graduated portion of the dial.

The automatic mechanism, which is the object of this invention, while maintaining the well known precision of semi-automatic scales give them a greatly extended scale of weights with all the advantages of automatic scales.

The annexed drawings represent, by way of example, one arrangement for carrying out the invention.

Fig. 2 is a side view of part of the same apparatus.

Fig. 3 is a side elevation of the controlling arrangement for the motor driving the automatic mechanism.

Figs. 5 and 6 are views from opposite sides of a detail of said arrangement.

Figure 1:
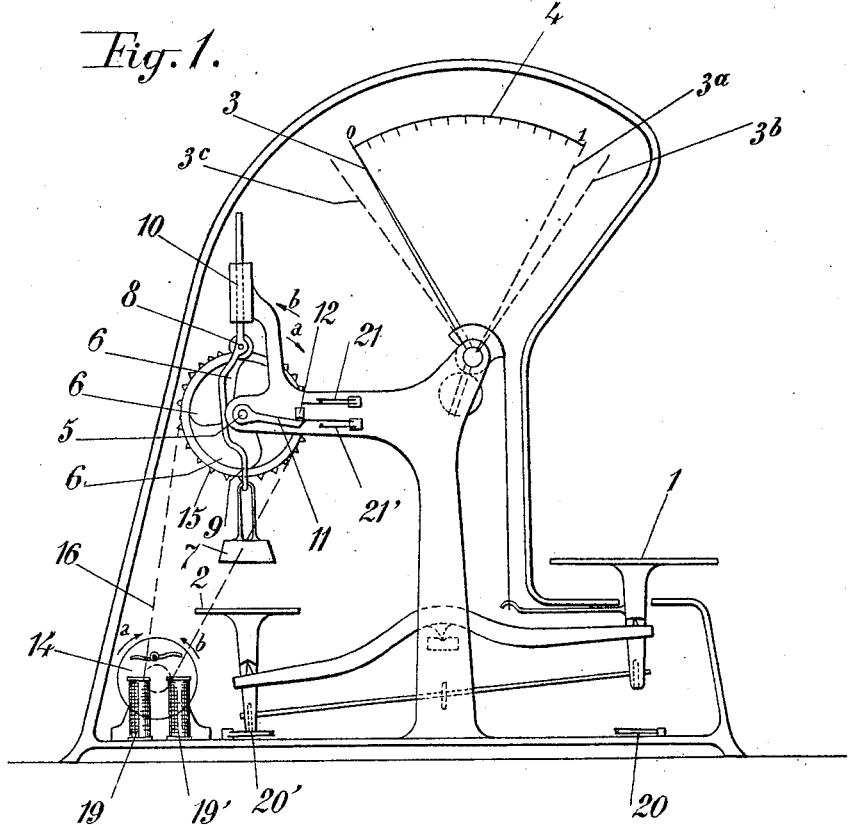
Fig. 1 shows the automatic arrangement applied to a semi-automatic scale, in which the supplementary unit weights are brought into action or withdrawn therefrom by means of cams moulded on a shaft.
Figure 5:
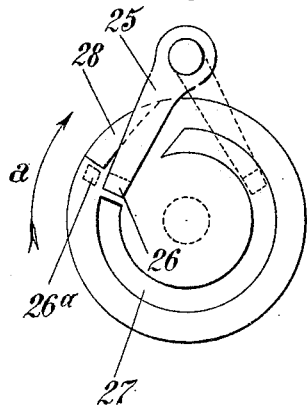
Figure 4:
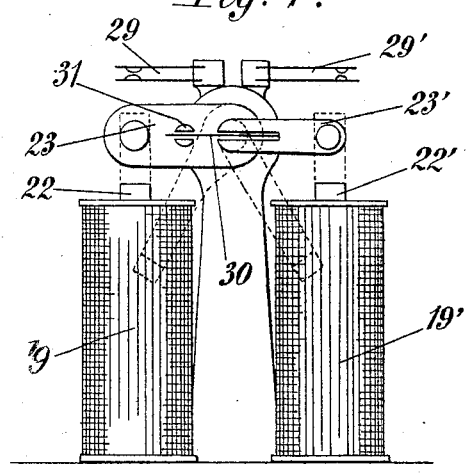
Fig. 4 is an end elevation thereof, whilst

Fig. 1 shows the scales in the position of equilibrium, the trays 1 and 2 being empty. The pointer 3 is at zero on the graduated scale 4 and moves over the scale to the position $3^a$ when a weight corresponding to the unit adopted for the scales is placed on the tray 1, but the needle can go beyond these two points and proceed on the one hand as far as $3^b$ if the weight placed on the tray 1 is greater than the said unit, or on the other hand as far as $3^c$ if the supplementary unit weight or weights placed on the tray 2 are greater than the weight deposited on the tray 1. The positions $3^b$ and $3^c$ correspond to the points when the respective trays are in their lowest position, and are in contact with the frame or base of the scales.

The supplementary weights are controlled from a shaft 5 (Figures 1 and 2) provided with cams 6 acting on the weights 7 through the intermediary of rollers 8 and hooks 9 guided in bearings 10. The cams 6 are conveniently arranged so as to cause one of the weights to be lowered and placed upon the tray 2 for each quarter of a turn of the shaft 5.

In the position shown, none of the supplementary weights is resting on the tray 2, but if a quarter of a revolution is given to the shaft 5 in the direction of the arrow $a$ one weight will be deposited for a further quarter of a revolution a second weight will also be deposited, and at the end of three quarters of a revolution the third weight will be deposited and at the same time the abutment 11 attached to the shaft 5 will strike against the stop 12 arranged on the frame of the scales. On the contrary for each quarter of a revolution given to the shaft 5 in the direction of the arrow $b$ one of the weights 7 will be raised from the tray the abutment 11 coming into contact with the other side of the stop 12, as shown in Fig. 1, when the last weight is raised.

The shaft 5 instead of being operated, as is usual, by means of a handle (shown at 13 in Figure 2) is according to the invention connected to an electric motor 14 by means of a toothed wheel 15, chain 16 and a small toothed pinion 17, (Fig. 2) the ratio of transmission being 1 to 4, i. e. each revolution of the motor causes the shaft to turn through a quarter of a revolution, that is to say, to deposit or raise one supplementary weight. The motor 14 carries at the end of its shaft opposite to that to which the pinion 17 is attached, a small cam-disc 18 which operates the motor controlling mechanism which will be more fully described. This mechanism is made to operate in one direction by an electro-magnet 19 whose energizing circuit is controlled by a contact 20 (Fig. 1) and in the other direction by an electro-magnet 19' whose energizing circuit is controlled by a contact 20'. The contacts 20 and 20' are situated under the extensions of the trays 1 and 2, and their respective circuits are not closed until the tray has moved sufficiently to displaced the needle 3 beyond the graduated portion of the sector 4.

Thus, when the tray 1 is charged with a weight greater than that of the unit on the scale pan 2 is moves the needle beyond the end of the sector 4, and at the same time it closes the contact 20 thus energizing the electro-magnet 19 and as will be described causing the motor to revolve in the direction of the arrow a (Fig. 1) which in turn causes one supplementary weight to be deposited upon the tray 2. If the first weight so deposited is sufficient to re-establish equilibrium, the action of the tray 1 upon the contact switch 20 ceases immediately, but if not, the circuit remains closed and the motor revolves until a second weight is deposited upon the tray 2. If these two weights are not sufficient to restore equilibrium, the action continues automatically for the third and last weight, but at this moment, the shaft 5, through the intermediary of the abutment 11, breaks the circuit by opening the safety contact switch 21 which is normally in closed position.

In this way, if the third weight is not sufficient to re-establish equilibrium, the circuit closed by the switch 20 is opened by the switch 21 in order not to leave the motor energized, the scales having reached their maximum capacity.

On the contrary, if after having deposited on the tray 1 a greater weight than that of the unit and having also deposited automatically sufficient supplementary weights on the tray 2 to raise such weight, or if, upon lightening the amount on the tray 1 to such a degree that the pointer 3 passes to the left of the zero mark of the graduation, the tray 2 will close the circuit through the contact switch 20' and the electro-magnet 19' will start the motor in the direction of the arrow b and one of the weights will be lifted, the operation being automatically repeated until such time as the pointer is brought to rest within the graduated zone of the sector 4.

A safety contact switch 21' is placed in circuit with electro-magnet 19' and contact 20' in order to open the circuit when all the supplementary weights have been raised.

It will be clear therefore that the scales will not be influenced by any oscillations of the pointer within the limits indicated on the graduated scale, and the scales therefore preserve all their precision, while for greater weights, the operation of the supplementary weights is automatic without the necessity for any intervention on the part of the operator.

When the circuit is closed by way of the contact switch 20 which energizes the electro-magnet 19, the core 22 of that magnet is raised into position shown in dotted lines and acts upon the lever 23. This lever is attached to a tubular shaft 24 to which is also attached a lever 25 terminating in a nose 26, which oscillates between the cam-surfaces 27 and 28 formed on the disc 18.

The swinging movement of the lever 23 causes the movement of the nose 26 towards a stud 26ᵃ and at the same time closes the contact switch 29 which completes circuit of the motor and causes it to revolve in the direction indicated by the arrow a. The electro-magnet 19' operates in a similar manner, the lever 23', arm 24', lever 25' and projection 26', which latter oscillates between cam surfaces 27' and 28' formed on the other side of the disc 18. It also acts, by the intermediary of the lever 23' on the contact switch 29' which closes the second motor circuit and causes the motor to revolve in the direction of the arrow b.

The levers 23 and 23' are in addition flexibly connected by means of a plate spring 30 housed in a slot in the lever 23' and sliding freely in a slot in a stud 31 fixed to the lever 23. In this manner the levers 23 and 23' both move together on a movement of the projection 26 towards the stud 26ᵃ, for example, causing the projection 26' to move towards the stud 26ᵇ in order to allow the disc 18 to revolve in the direction a.

When the cam-disc 18 has turned through nearly a revolution in the direction a, the cam surface 28 returns the projection 26 and the lever 23 to their original positions while the lever 23 opens the circuit at 29, the projection 26 abuts against the cam 27 and stops the motor at the end of exactly one revolution. If this one revolution is not sufficient to restore the equilibrium of the scales and the electro-magnet 19 is again energized, the action of the lever 23 causes the motor to make a further revolution.

On the other hand, when the circuit through the switch 20' is closed to energize the electromagnet 19' the operation is executed in an exactly similar manner to cause the motor to revolve in the direction of the arrow b.

It is evident that the arrangements described above can be varied in a large measure without affecting the characteristics of the invention.

What I claim is:—

1. Weighing apparatus comprising a weighing pan an indicating pointer connected therewith and moving over a graduated scale, a secondary pan connected to said weighing pan, a lever connecting the two pans, automatic means for depositing weights on said secondary pan, an automatic motor adapted to operate said automatic means and an electromagnetic switch in circuit with said electric motor adapted to be operated by movement of one of said pans, and operated directly by the pan support.

2. Apparatus as in claim 1 comprising two electromagnets adapted to operate said electromagnetic switch and two switches adapted to be operated by said two pan supports respectively for causing movement of said motor in one direction or the other.

3. Weighing apparatus comprising a weighing pan, an indicating pointer connected therewith and moving over a graduated scale, a secondary pan connected to said weighing pan, circuit closing contacts co-operating with said pans and electro-magnetic means energized through said contacts, a lever controlled by the armature of said electro-magnet, a cam-disc mounted on a motor shaft and co-operating with said lever to control the extent of rotation of said motor, and contact springs operated by said armature to start said motor to deposit or remove weights on or from said secondary pan.

4. Weighing apparatus comprising a weighing pan, an indicating pointer connected therewith and moving over a graduated scale, a secondary pan connected to said weighing pan, circuit closing contacts co-operating with said pans and electro-magnetic means energized through said contacts, a lever controlled by the armature of said electro-magnet, a cam disc mounted on a motor shaft and co-operating with said lever to control the extent of rotation of said motor, and contact springs operated by said armature to start said motor cam driven by said motor and means controlled by said cams for raising or lowering weights from or on said secondary pan.

In testimony whereof I affix my signature.

PAUL DURAND.